(12) United States Patent
Gutcher et al.

(10) Patent No.: US 8,413,031 B2
(45) Date of Patent: Apr. 2, 2013

(54) METHODS, APPARATUS, AND SYSTEMS FOR UPDATING LOGLIKELIHOOD RATIO INFORMATION IN AN NT IMPLEMENTATION OF A VITERBI DECODER

(75) Inventors: Brian K. Gutcher, Loveland, CO (US); Kripa Venkatachalam, Concord, MA (US)

(73) Assignee: LSI Corporation, San Jose, CA (US)

( * ) Notice: Subject to any disclaimer, the term of this patent is extended or adjusted under 35 U.S.C. 154(b) by 1057 days.

(21) Appl. No.: 12/336,186

(22) Filed: Dec. 16, 2008

(65) Prior Publication Data

US 2010/0150280 A1  Jun. 17, 2010

(51) Int. Cl.
   *H03M 13/03* (2006.01)
(52) U.S. Cl. .................................................. 714/795
(58) Field of Classification Search .................. 714/795; 375/341

See application file for complete search history.

(56) References Cited

U.S. PATENT DOCUMENTS

| | | | |
|---|---|---|---|
| 6,445,755 B1 * | 9/2002 | Chung et al. .................. | 375/341 |
| 6,484,283 B2 * | 11/2002 | Stephen et al. ................ | 714/786 |
| 6,658,071 B1 * | 12/2003 | Cheng ............................ | 375/348 |
| 6,697,443 B1 * | 2/2004 | Kim et al. ...................... | 375/341 |
| 6,901,119 B2 | 5/2005 | Cideciyan et al. | |
| 6,999,532 B2 | 2/2006 | Kuo et al. | |
| 7,012,974 B1 | 3/2006 | Liu et al. | |
| 7,123,668 B2 * | 10/2006 | Fredrickson .................. | 375/341 |
| 7,191,377 B2 * | 3/2007 | Berens et al. ................. | 714/755 |
| 7,197,689 B2 * | 3/2007 | Hekstra et al. ................ | 714/792 |
| 7,383,484 B2 * | 6/2008 | Yeh et al. ...................... | 714/780 |
| 7,536,630 B2 * | 5/2009 | Chun et al. .................... | 714/790 |
| 7,653,153 B2 * | 1/2010 | Tosato et al. .................. | 375/341 |

(Continued)

FOREIGN PATENT DOCUMENTS

JP    2000158758    6/2000

OTHER PUBLICATIONS

Hagenauer,J.etal.;Aviterbi Algorithm With Soft-Decision Outputs and Its Applications;1989; IEEE.

(Continued)

*Primary Examiner* — Amine Riad
(74) *Attorney, Agent, or Firm* — Duft Bornsen & Fettig LLP

(57) ABSTRACT

Methods and circuits comprising a reliability measurement unit (RMU) for generating log-likelihood ratio (LLR) values corresponding to 1T for use in a soft output Viterbi algorithm ("SOVA") decoder. The RMU operates with an nT clock signal. 1T signals generated by an add, compare, select circuit (ACS) of the SOVA generates 1T decision data and a path equivalency detector generates 1T path equivalency information for 1T SOVA decoding and applies the 1T data to the RMU operating with an nT clock frequency (1/n'th that of the 1T clock signal). The nT RMU receives a plurality of 1T inputs on each nT clock signal pulse and generates 1T LLR information for use by the SOVA decoder. Other components of the SOVA may also operate using the nT clock signal pulse or may operate using a 1T clock signal.

11 Claims, 5 Drawing Sheets

U.S. PATENT DOCUMENTS

| | | | |
|---|---|---|---|
| 7,716,564 B2 * | 5/2010 | Yen et al. | 714/794 |
| 7,721,181 B2 * | 5/2010 | Liao et al. | 714/758 |
| 8,161,357 B2 * | 4/2012 | Tan et al. | 714/780 |
| 8,230,312 B1 * | 7/2012 | Yeo et al. | 714/795 |
| 2001/0052104 A1 * | 12/2001 | Xu et al. | 714/792 |
| 2004/0022336 A1 * | 2/2004 | Yu et al. | 375/346 |
| 2005/0066259 A1 * | 3/2005 | Park et al. | 714/795 |
| 2005/0268210 A1 * | 12/2005 | Ashley et al. | 714/792 |
| 2009/0168926 A1 * | 7/2009 | Venkatachalam et al. | 375/341 |
| 2010/0325525 A1 * | 12/2010 | Heinrich | 714/795 |

OTHER PUBLICATIONS

Black, Peter J. et al.; A 140-Mb/s, 32-State, Radix-4 Viterbi Decoder; IEEE Journal of Solid-State Circuits; Dec. 1992; pp. 1877-1885.

Yeo, Engling et al.; 500Mb/s Soft Output Viterbi Decoder; ESSRIC 2002; pp. 523-526.

Yeo, Engling et al.; 500Mb/s Soft Output Viterbi Decoder; IEEE Journal of Soild-State Circuits; Jul. 2003; pp. 1234-1241.

* cited by examiner

METHODS, APPARATUS, AND SYSTEMS FOR UPDATING LOGLIKELIHOOD RATIO INFORMATION IN AN NT IMPLEMENTATION OF A VITERBI DECODER

RELATED PATENT APPLICATIONS

This patent application is related to U.S. patent application Ser. No. 11/696,300 filed 4 Apr. 2007 and entitled "METHODS, APPARATUS, AND SYSTEMS FOR DETERMINING 1T STATE METRIC DIFFERENCES IN AN nT IMPLEMENTATION OF A VITERBI DECODER" which is hereby incorporated by reference and is related to U.S. patent application Ser. No. 11/966,833 filed 28 Dec. 2007 and entitled "METHODS, APPARATUS, AND SYSTEMS FOR DETERMINING 1T PATH EQUIVALENCY INFORMATION IN AN nT IMPLEMENTATION OF A VITERBI DECODER" which is hereby incorporated by reference. Collectively the above related applications are referred to herein as the "Sibling" patent applications or simply as the "Siblings".

BACKGROUND

1. Field of the Invention

The invention relates to methods, apparatus, and systems utilizing soft output Viterbi algorithms in a digital channel decoder. More specifically the invention relates to methods, apparatus, and systems for updating log-likelihood ratio (LLR) information in an nT implementation of a soft output Viterbi decoder.

2. Discussion of Related Art

In most present digital communication channels, information is encoded in a manner to improve reliability of the transmitted information in the presence of imperfect or noisy communication channels. Exemplary of such communication channels are digital voice and data communication channels utilizing, for example, RF modulation for transmission of digital data. Another exemplary application of such digital channels are storage devices with read/write channels that write digital information using optical or magnetic modulation techniques for later recovery through a corresponding read channel.

One common decoding algorithm is known as the Viterbi algorithm. Broadly speaking, the Viterbi algorithm is a dynamic programming algorithm that determines the most likely sequence of states that result in a sequence of observed events in the received signal. This most likely sequence of states then defines the decoded symbol based on the path of most likely values of the observed events. In general, the Viterbi decoder determines the most likely transmitted sequence of encoded data bits that may be the underlying cause of an observed sequence of sensed events. In other words, the Viterbi decoder determines the most likely sequence of encoded data bits represented by a received sequence of modulated events.

Improvements to the Viterbi algorithm known as the soft output Viterbi algorithm (SOVA) improve upon prior algorithms by including reliability or probability information for each decoded bit of the decoded symbol and, by accumulating this bit-wise reliability or probability information, a reliability or probability value associated with the most likely decoded symbol can be generated. Basic concepts of the SOVA techniques and common applications thereof are well known to those of ordinary skill in the art and are notoriously disclosed by Hagenauer and Hoeher in 1989 in the paper entitled "A Viterbi Algorithm With Soft-Decision Outputs and its Applications" (IEEE 1989 and incorporated herein by reference). The SOVA algorithms utilize branch metric information associated with each branch from the first state to each of two subsequent, potential follow-on states to determine the most likely branch for a next sensed event. Hagenauer and Hoeher first taught that the difference in accumulated branch metric information between the most likely and second most likely paths of the Viterbi detector in response to each sensed event is a useful approximation of the log-likelihood ratio (LLR) used in the SOVA techniques to determine reliability of the surviving path (e.g., reliability of the decoded bit). This state metric difference (SMD) is therefore used to implement SOVA techniques in present Viterbi decoders.

Those of ordinary skill in the art will readily recognize that the state metric and branch metric information discussed herein is also more simply referred to herein as "metric" information or as "path metric" information.

In earlier Viterbi algorithm state machines, each bit or received event is received or sensed on a corresponding cycle of an applicable clock signal. The clock signal generally cause a transition of the state machine to determine the most likely bit value for the sensed event based on past sensed events and corresponding branch metric information. In other words, each clock cycle of the Viterbi algorithm state machine corresponds to decoding of one bit of the encoded symbol. Branch metric information is therefore encoded in association with each possible transition corresponding to each clock cycle operable in the Viterbi algorithm state machine. Such Viterbi decoders in which each clock pulse corresponds to processing of one event (e.g., decoding of a next bit) are referred to in the industry and herein as "1T" Viterbi decoders.

As the data rate (e.g., "baud" rate) for application of Viterbi decoders has increased, many present day decoders utilized a "2T" decoder structure such that each clock cycle decodes a sequence of two consecutive bits of the encoded symbol. Such a 2T decoder implementation has four possible transitions from a current state to a next state based upon a sensed event representation of two encoded bits. Thus the clock rate of the Viterbi decoder state machine is typically half that of the data/baud rate of transmitted information. More generally, modern Viterbi decoders may utilize a clock rate whose frequency is an integer fraction of the corresponding data rate. In other words, an "nT" Viterbi decoder may use a clock that has a frequency of 1/n times the data rate. Thus each clock pulse in an nT Viterbi decoder represents n bits of the symbol to be decoded. An nT Viterbi decoder is therefore operable in accordance with an nT state machine.

The Sibling patent applications teach methods and apparatus for generating 1T path metric information and 1T path equivalency information from an nT Viterbi decoder design. A paper by Yeo et al entitled "500 Mb/s Soft Output Viterbi Decoder" (ESSCIRC 2002; pp. 523-526-hereinafter "Yeo" and hereby incorporated by reference) presents a 1T SOVA decoder design. The 1T SOVA design of Yeo includes a reliability measurement unit (RMU) component that updates the confidence or reliability of each decoded bit in response to a received sequence of SMD and PED information. As known to those of ordinary skill in the art, the RMU generates an LLR value to update the confidence of each decoded bit based on the PED equivalency information provided by the PED and the SMD values provided by the ACS.

To update the appropriate LLR values in an nT Viterbi design having an nT RMU it is necessary for the RMU to know the equivalency bit and the SMD information at each decision node (i.e., at each 1T decision node) rather than just at each clock pulse (i.e., at each nT clock pulse).

It is evident from the above discussion that an ongoing need exists to usefully apply SOVA techniques in an nT state machine implementation of a Viterbi decoder to provide 1T updated LLR information for the nT SOVA implementation.

SUMMARY

The present invention solves the above and other problems, thereby advancing the state of the useful arts, by providing methods and structure for determining 1T log-likelihood (LLR) information in an nT implementation of an RMU in a SOVA decoder. The updated LLR information may then be utilized in well-known SOVA methods within the Viterbi decoder to produce higher quality reliability/probability information for the decoder output while operating the RMU based on a slower nT clock frequency.

One aspect provides a method for generating 1T log-likelihood ratio (LLR) values from an nT reliability measurement unit (RMU) in a soft output Viterbi algorithm (SOVA) decoder where n is greater than 1. The method is operable responsive to each nT clock pulse and includes receiving multiple inputs in the RMU the multiple inputs corresponding to signals generated by 1T operation of the SOVA decoder. The method also includes generating LLR values in the nT RMU based on the received 1T multiple inputs. The method then outputs the LLR values as soft output information associated with the decision data output of the SOVA decoder.

Another aspect hereof provides a circuit usable in conjunction with a soft output Viterbi algorithm (SOVA) decoder, the SOVA decoder operable to generate 1T signals as inputs to the circuit. The circuit includes an nT clock signal source adapted to generate an nT clock signal pulse at a frequency of 1/n of the data rate of the SOVA decode where n is greater than 1. The circuit further includes an nT reliability measurement unit (RMU) circuit coupled to receive the nT clock signal pulses. The RMU circuit adapted to receive 1T input signals from the SOVA decoder and further adapted to output n log-likelihood ratio (LLR) values in response to each nT clock pulse signal, the LLR values based on the received 1T input signals. The n LLR values used by the SOVA decoder to determine a most likely output for a received symbol.

DETAILED DESCRIPTION OF THE DRAWINGS

Figure 1:
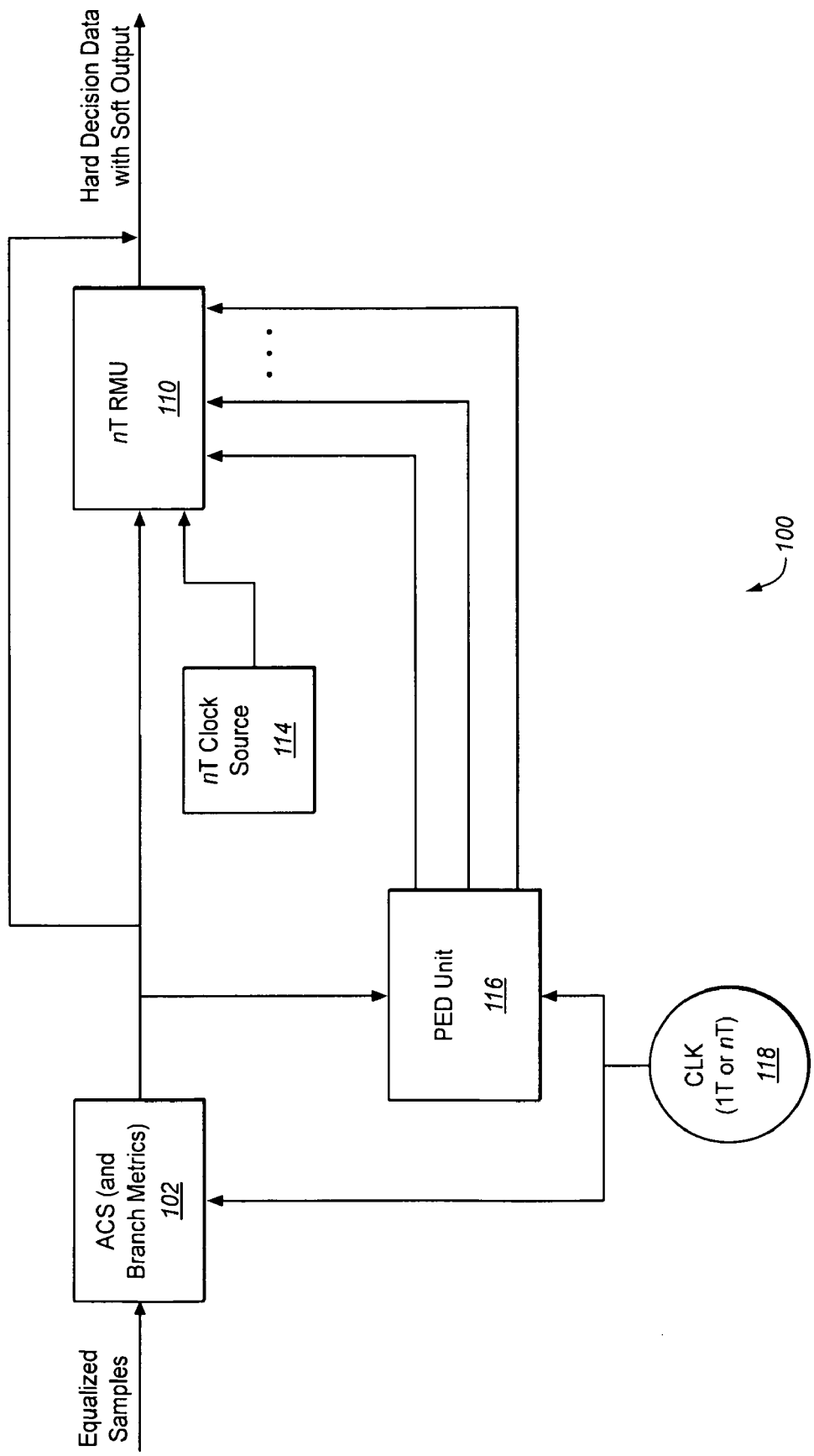
FIG. 1 is a block diagram of an exemplary SOVA decoder enhanced in accordance with features and aspects hereof to generate 1T log-likelihood ratio (LLR) reliability/confidence information in an RMU operating with an nT clock in accordance with features and aspects hereof.

FIG. 1 is a block diagram of an exemplary SOVA decoder 100 enhanced in accordance with features and aspects hereof to provide 1T LLR information from an RMU operating in accordance with a clock rate at a fraction of the intended data throughput rate. Clock source 114 provides a clock for nT RMU 110 of SOVA decoder 100. In other words, every clock signal from clock source 114 initiates processing of n input signals applied to nT RMU 110 to generate a corresponding n LLR values (soft output) to accompany the hard decision data otherwise generated by the SOVA decoder 100 operation. Such a decoder may be referred to herein as an nT SOVA decoder when all components of the decoder operate on the same nT clock source 114. Further, the various other components of SOVA decoder 100 may be referred to as "nT" components. For example, ACS 102 may be an nT ACS and PED unit 116 may be an nT PED unit. It will be understood however that nT RMU 110 may be used with 1T components of SOVA decoder 100. For example, ACS 102 and PED unit 116 may operate using a 1T clock source. Thus, CLK 118 is shown as a clock source for ACS 102 and PED unit 116 to indicate that they may use a 1T clock or may share the same nT clock source (114) used to clock operation of nT RMU 110.

In one exemplary preferred embodiment, "n" may be 2 such that the SOVA decoder 100 is referred to as a 2T SOVA decoder and the components thereof may be referred to as 2T components. Add, compare, select (ACS) component 102 receives equalized samples from a source (not shown) of such discrete time sample values. Equalized samples are generated by sampling and filtering a continuous analog signal. The continuous signal may be generated by sensing modulations of magnetic or optical properties of a medium (such as in magnetic or optical storage devices) or as modulations of an electromagnetic signal (e.g., a radio frequency signal) used to encode digital data for transmission. The filtering and pre-processing techniques and structures (not shown) to sample and equalize the sensed samples are well known to those of ordinary skill in the art and omitted herein for simplicity and brevity of this discussion.

For the remainder of this discussion, it will be presumed that ACS 102 and PED unit 116 also operate using the same nT clock source 114 that clocks operation of nT RMU 110. Those of ordinary skill in the art will readily recognize equivalent structures wherein the RMU 110, ACS 102, and PED 116 may all utilize nT clock signals generated from a 1T clock source where nT clock source 114 is a clock divider circuit to reduce the frequency applied to the RMU, ACS, and PED by 1/n.

Responsive to each clock pulse from nT clock source 114, ACS 102 generates decision n nodes (hard decision data) and associated branch metric information for all decision nodes (time intervals) ranging from time interval 1 through n processed at the current nT clock signal pulse from source 114. In other words, ACS 102 is adapted to generate hard decision data and associated branch metrics for decision nodes corresponding to time intervals of 1T, 2T . . . through nT. In like manner, PED unit 116 is responsive to each clock pulse from nT clock source 114 to generate path equivalency information applied to RMU 110. PED unit 116 generates path equivalency information corresponding to each decision node ranging from time intervals 1 through n in response to each nT clock pulse from source 114. In other words, PED unit 116 generates path equivalency information for decision nodes corresponding to time intervals 1T, 2T . . . through nT. The Siblings noted above provides exemplary details of such an ACS unit and PED unit adapted to generate 1T equivalent data from an nT design Viterbi decoder.

RMU 110 monitors and updates log-likelihood ratio (LLR) information based on the hard decision information received from ACS 102 (e.g., path metric information) and based on the path equivalency information for decision nodes 1T through nT received from PED unit 116. Details of operation of a typical 1T RMU are generally known to those of ordinary skill in the art. For example, Yeo teaches one exemplary embodiment of a 1T RMU adapted for processing path equivalency information to generate soft outputs. By contrast, nT RMU 110 receives n 1T hard decision data values (i.e., path metric information) from ACS 102 and 1T path equivalency information values from PED 116 and is operable in response to each nT clock pulse to generate corresponding 1T soft output signals associated with the applied hard decision data. By operating at the slower clock frequency of 1/n of the 1T clock frequency, the design of RMU 110 may utilize less power and may be designed using slower discrete components. SOVA decoder 100 of FIG. 1 is therefore enhanced by use of the nT RMU 110 coupled with its corresponding nT clock source 114.

The hard decision data generated by ACS 102 and the soft output signals from RMU 110 corresponding to each of the hard decisions data values is then applied to some utilization circuit (not shown) to utilize the decoded hard data and the probability information represented as the soft output signals corresponding to the hard decision data.

Those of ordinary skill in the art will readily recognize the omission in FIG. 1 of appropriate FIFO and/or register exchange circuits to assure coordination and alignment of the hard decision data and associated path equivalency information as the various elements of data are clocked through the SOVA detector 100. Thus appropriate FIFOs, registers, and/or other related memory and logic components may be utilized as well known in the art to provide requisite alignment and synchronization of the various data elements generated and utilized within SOVA decoder 100. Such elements are omitted from FIG. 1 merely for brevity and simplicity of the description of the features and aspects hereof.

To further understand operation of nT RMU 110, an exemplary embodiment of a 2T RMU is discussed further herein below with respect to FIGS. 3 and 4. To explain operation of the exemplary 2T RMU in FIGS. 3 and 4 it is first helpful to understand the operation of a 2T RMU design in the context of an exemplary 1T RMU indicating the corresponding time slices of a 2T implementation based on the 1T RMU operation. Although the following discussion centers on an exemplary 2T RMU design and operation, those of ordinary skill in the art will readily recognize how the exemplary 2T design may be expanded to nT where n is greater than 2. Thus the exemplary 2T RMU design discussed in the following figures and equations is intended merely as exemplary of one possible embodiment of an nT design in accordance with features and aspects hereof.

In a 2T RMU design, the RMU needs to be capable of accepting two SMD values from the ACS and two sets of path equivalency information vectors from the PED to generate the two required LLR values in each 2T clock cycle. The reliability of a specific output hard decision bit is no higher than the confidence measure (LLR value) of the weakest link in the path leading to the final decision bit. In other words, the smallest SMD encountered, with dissimilar competing path equivalency information bits at a given node within the PED (EQ=0) in the most likely path would be the confidence measure or the LLR value of the output hard decision bit. A 2T RMU should be capable of advancing the entire RMU pipeline (several RMU slices stacked together) to reflect the contents of a 1T RMU advanced through two clock cycles. The exemplary 2T RMU embodiment described herein is capable of generating outputs identical to that which would be generated by two 1T clock cycles but does so at half the clock frequency of an equivalent 1T RMU.

Figure 2:
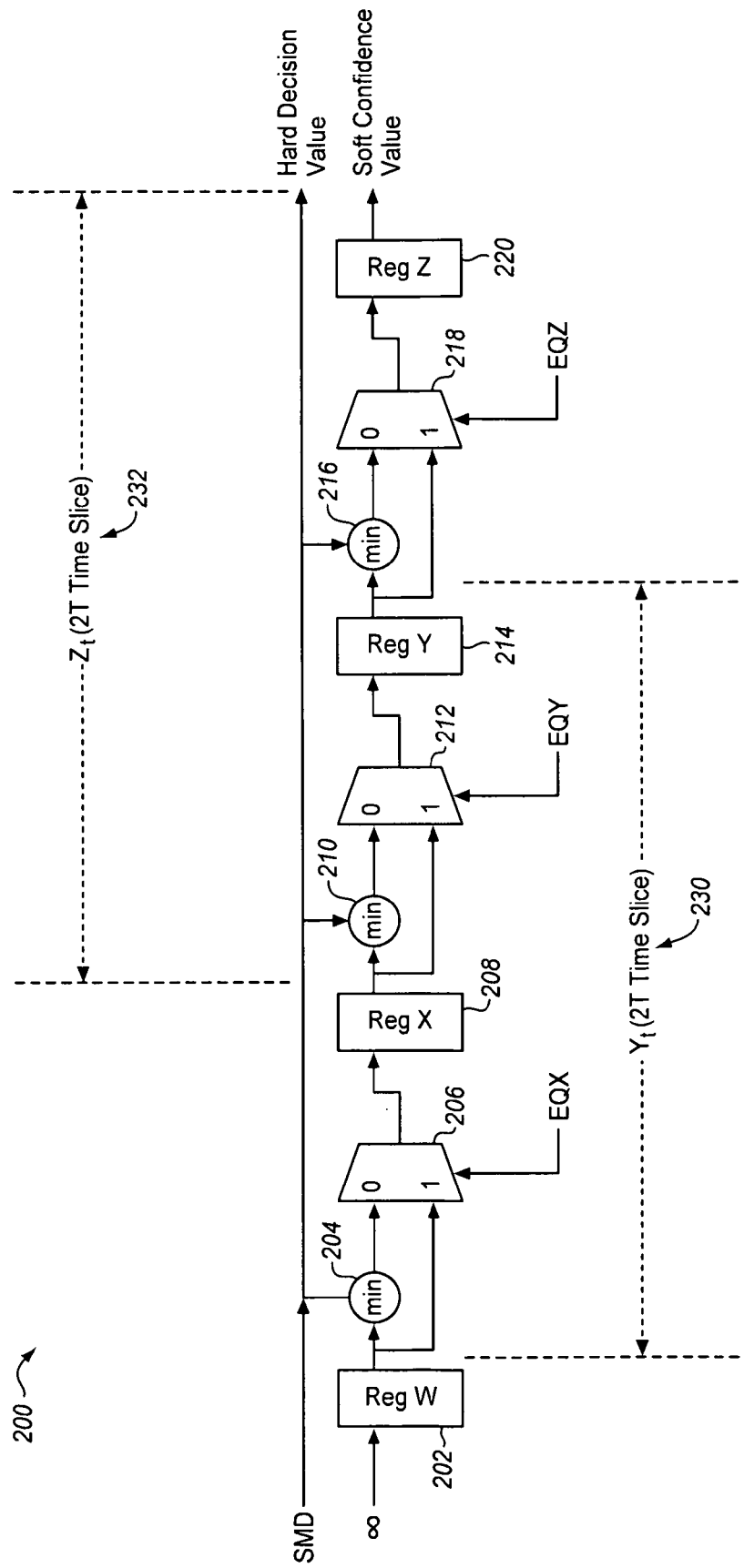
FIG. 2 is a diagram describing operation of a well known 1T RMU pipeline while denoting exemplary 2T clock pulses to describe the operation of an exemplary 2T RMU pipeline in accordance with features and aspects here.

FIG. 2 depicts the relationship between timing of an exemplary 2T RMU embodiment that of a known 1T RMU engine by illustrating the overlap of the 2T time slices on a 1T implementation. In the exemplary 2T RMU embodiment, the output at every node is modeled as a function of: 1) RMU content two 1T clock cycles earlier and two spatial nodes prior, and 2) the path equivalency information (EQ bits) of the two prior spatial nodes at the two past 1T time instances.

Updating and propagating the appropriate LLR through the RMU engine relies on understanding how the various decision bits travel through the trellis in time and space. During the two 1T clock cycles embedded in a 2T clock cycle, not only has the trellis advanced two time steps, but has also moved the surviving decision bits forward based on maximum likelihood comparisons.

Figure 3:
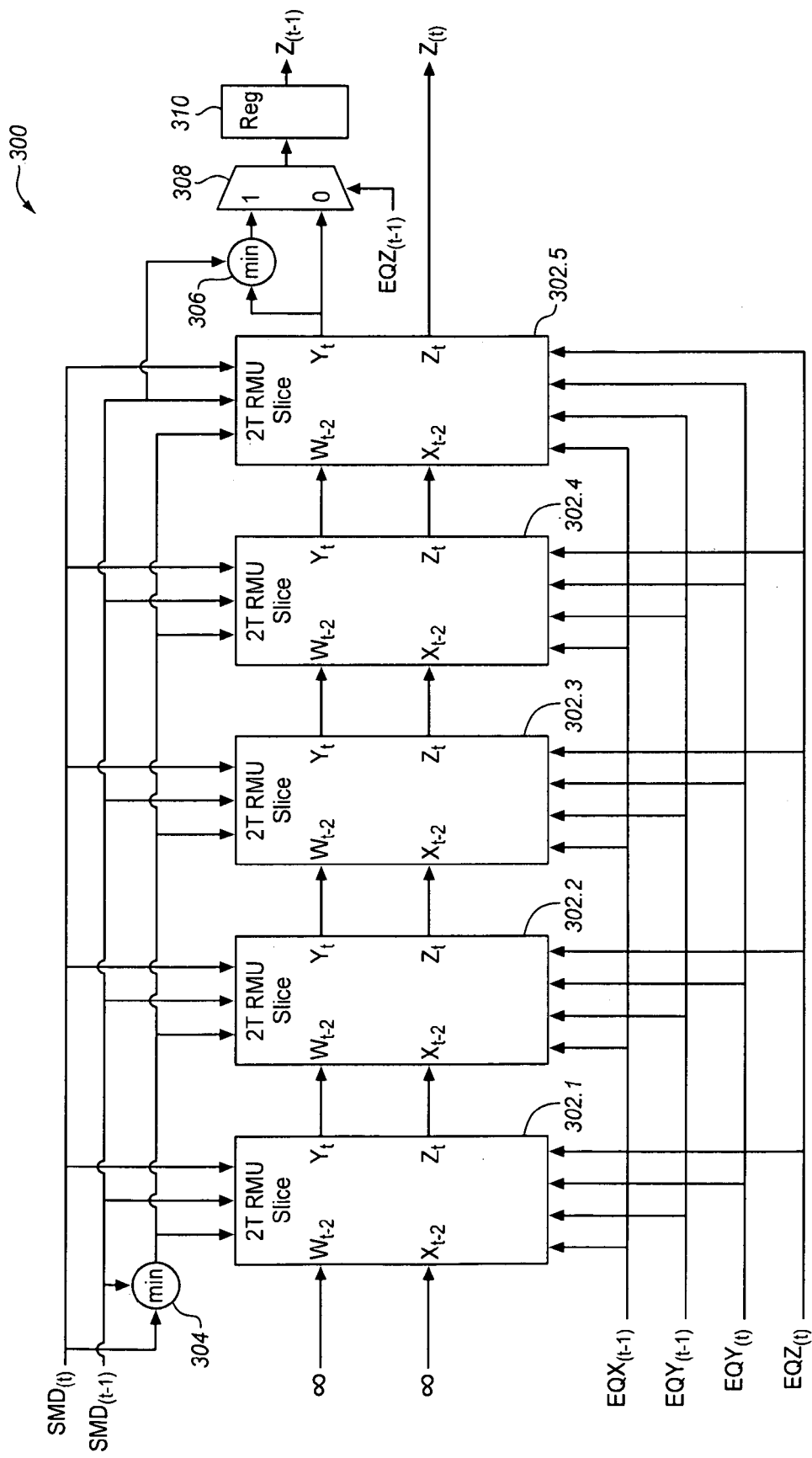
FIG. 3 is a block diagram of an exemplary 2T RMU pipeline in accordance with features and aspects hereof.
Figure 4:
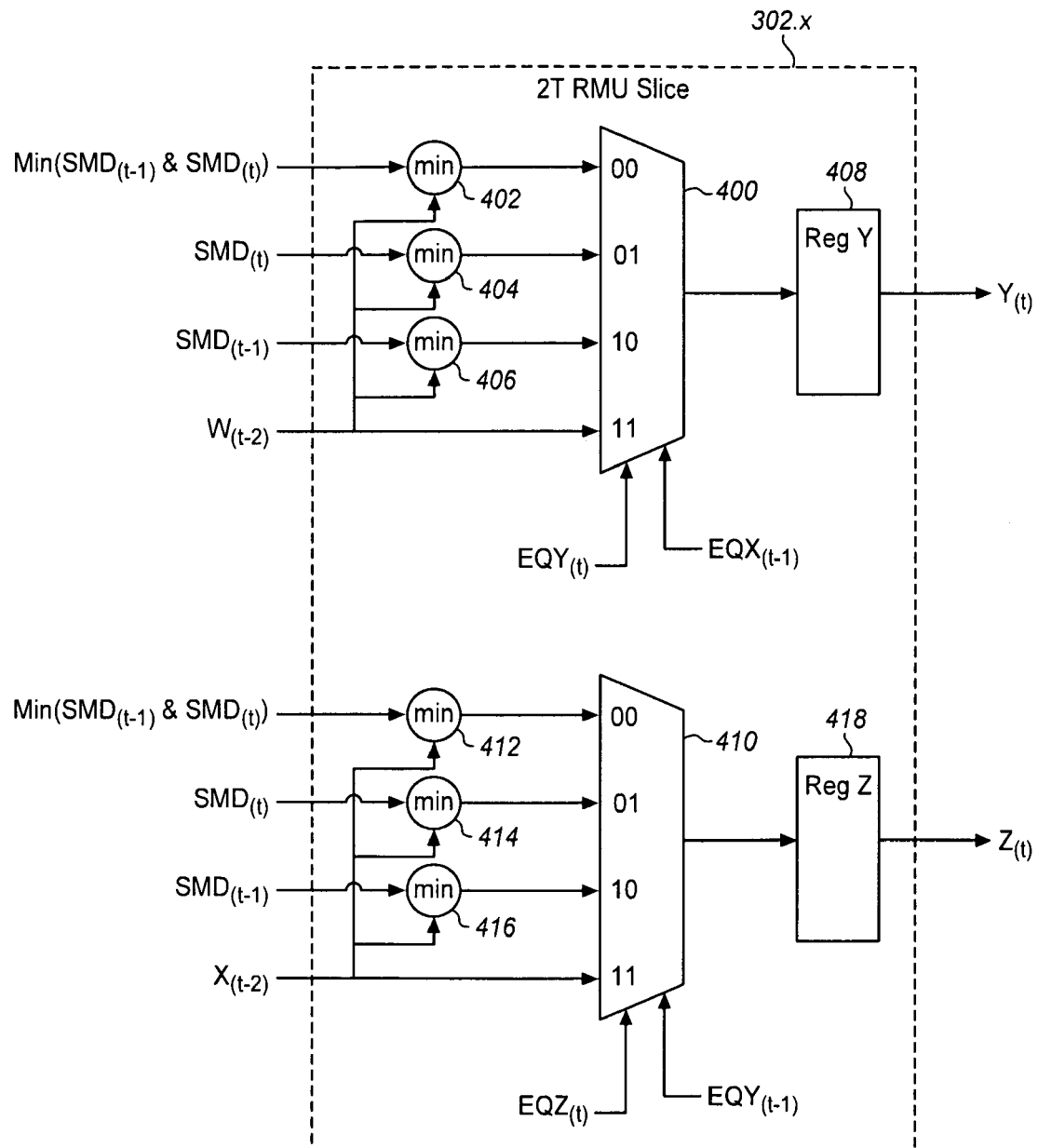
FIG. 4 is a block diagram of an exemplary 2T RMU slice of the exemplary 2T RMU pipeline of FIG. 3 and in accordance with features and aspects hereof.

To explain the functionality of the exemplary 2T RMU embodiment of FIGS. 3 and 4, we review operation of a typical 1T RMU of depth four as shown in FIG. 2. Let the four nodes be named W, X, Y, and Z. Let the four state metric difference (SMD) values fed to the 1T RMU in four consecutive 1T clock cycles be $SMD_{t-3}$, $SMD_{t-2}$, $SMD_{t-1}$ and $SMD_t$. The EQ bit vector (path equivalency information) generated by the PED at time t would be $EQW_t$, $EQX_t$, $EQY_t$, and $EQZ_t$. We will use the above terminology in FIGS. 2 through 5 to explain the functionality of the exemplary 2T RMU embodiment as well as the operation of a 1T RMU embodiment of FIG. 2.

In the 1T, depth 4, RMU pipeline 200 of FIG. 2, REG W 202, REG X 208, REG Y 214, and REG Z 220 are each clocked by a ubiquitous 1T clock signal (not shown). In a 1T design, if at a given node, the competing decision bits are similar (EQ=1), then we retain and propagate the existing log-likelihood value in the RMU pipeline. If at a given node, the competing bits are dissimilar (EQ=0), then we compare the existing LLR value with the incoming SMD and propagate the minimum of the two through the RMU. For example, REG W 202 receives an initial LLR value indicating a highest possible confidence value (e.g., an infinite LLR value). At a first 1T clock pulse (t−3), the registered LLR value in REG W 202 and the current SMD value ($SMD_{t-3}$) are applied as inputs to "min" function 204. "min" functions are logic circuits that compare applied input values and output the minimum value of all the applied input values. Such a logic circuit is well known to those of ordinary skill in the art. The output of the min function 204 and the presently registered value in REG W 202 are applied as inputs to multiplexor 206. Multiplexor 206 receives the path equivalency vector bit EQX from the PED (at time t−3) and thus selects one of its two inputs as its output signal. If the EQX bit is 1 (the competing decision bits are similar) then the existing LLR value (from REG W 202) is propagated forward through multiplexor 206 as the LLR value of this stage of the pipeline 200. Otherwise, the minimum of the REG W 202 LLR value and the current $SMD_{t-3}$ value is propagated forward from this stage of the pipeline via multiplexor 206. Each stage of the pipeline continues the same basic function. Specifically, REG X 208 receives the output of the first stage at a next 1t clock pulse (t−2), min 210 compares that value to the then current SMD value (at time t–2), the output of min 210 and REG X 208 are applied to multiplexor 212 which then selects one or the other to propagate based on its selection input EQY, and so on until the ultimate pipeline output "Z" at time t is generated as the output of REG Z 220.

Operation of the 1T pipeline 200 of FIG. 2 is well known to those of ordinary skill in the art. Of note on FIG. 2 is the vertical dashed line pairs that depict the overlap of the computations of two consecutive 1T clock pulses for computing the desired outputs in the exemplary 2T RMU embodiment of FIGS. 3 and 4 described below. For each 2T clock pulse the results $Y_t$ and $Z_t$ would be calculated simultaneously in a 2T RMU implementation. The information required to calculate $Y_t$ and $Z_t$, respectively, is contained within the vertical, paired dashed lines 230 and 232 of FIG. 2. The circuit of FIG. 4 is an exemplary embodiment for performing such simultaneous calculations. In a 2T RMU design, the output at node Z (REG Z 220) at time t would be determined by the path equivalency information values $EQY_{t-1}$ and $EQZ_t$. Depending on the values of $EQY_{t-1}$ and $EQZ_t$, four possible scenarios emerge. The four scenarios are presented below as a function of the LLR value at $X_{t-2}$ (REG X 208 at time t–2), the incoming SMD value at time t and at time t–1, and path equivalency information values $EQY_{t-1}$ and $EQZ_t$.

- Case 1: If the competing decision bits are the same at Z (REG Z 220) at time t and at Y (REG Y 214) at time t–1, then the LLR value at $X_{t-2}$ (REG X 208 at time t–2) is propagated unchanged.
- Case 2: If the competing decision bits are the same at Z (REG Z 220) at time t and different at Y (REG Y 214) at time t–1, then, in a 1T design, $Y_{t-1}$ would have been updated to $min(X_{t-2}, SMD_{t-1})$. Further, because $EQZ_t=1$, $Z_t$ would be the same as $Y_{t-1}$, i.e., Zt would be $min(X_{t-2}, SMD_{t-1})$.
- Case 3: If the competing decision bits are the same at Y (REG Y 214) at time t–1 and different at Z (REG Z 220) at time t, then, in a 1T design, $Y_{t-1}$ would have the same value as $X_{t-2}$. Further, because $EQZ_t=0$, $Z_t$ would be updated to $min(X_{t-2}, SMD_t)$.
- Case 4: If the competing decision bits are different at Y (REG Y 214) at time t–1 and different at Z (REG Z 220) at time t, then, in a 1T design, $Y_{t-1}$ would have been updated to $min(X_{t-2}, SMD_{t-1})$. Further, because $EQZ_t=0$, $Z_t$ would be updated to $min(Y_{t-1}, SMD_t)$ i.e., $Z_t$ would be $min(X_{t-2}, SMD_{t-1}, SMD_t)$.

Now having calculated Zt, $Z_{t-1}$ may be calculated in the 2T RMU design. If the competing decision bits are different at Z (REG Z 220) at time t–1, then $Z_{t-1}$ would be $min(Y_{t-2}, SMD_{t-1})$. If the competing decision bits are the same, then $Z_{t-1}$ would be simply $Y_{t-2}$.

To generate $Z_t$ and $Z_{t-1}$ as described above, a 2T RMU slice would generate both $Y_t$ and $Z_t$ in the above described manner. The equations to calculate $Y_t$ can be derived in a similar fashion as that of $Z_t$. Expressed more concisely as logic equations, $Y_t$, $Z_t$, and $Z_{t-1}$ may be computed as follows:

if $(EQY_t=1)$ & $(EQX_{t-1}=1)$ then $Y_t=W_{t-2}$ if $(EQY_t=1)$ & $(EQX_{t-1}=0)$ then $Y_t=min(W_{t-2}, SMD_{t-1})$ if $(EQY_t=0)$ & $(EQX_{t-1}=1)$ then $Y_t=min(W_{t-2}, SMD_t)$ if $(EQY_t=0)$ & $(EQX_{t-1}=0)$ then $Y_t=min(W_{t-2}, SMD_{t-1}, SMD_t)$ if $(EQZ_t=1)$ & $(EQY_{t-1}=1)$ then $Z_t=X_{t-2}$ if $(EQZ_t=1)$ & $(EQY_{t-1}=0)$ then $Z_t=min(X_{t-2}, SMD_{t-1})$ if $(EQZ_t=0)$ & $(EQY_{t-1}=1)$ then $Z_t=min(X_{t-2}, SMD_t)$ if $(EQZ_t=0)$ & $(EQY_{t-1}=0)$ then $Z_t=min(X_{t-2}, SMD_{t-1}, SMD_t)$ if $(EQZ_{t-1}=1)$ then $Z_{t-1}=min(Y_{t-2}, SMD_{t-1})$ if $(EQZ_{t-1}=0)$ then $Z_{t-1}=Y_{t-2}$ All slices of a 2T RMU pipeline (slices stacked to provide a desired depth of reliability analysis) perform these same equations to compute $Y_t$ and $Z_t$. However, further processing is performed by a final slice (at time t) in a pipelined plurality of 2T RMU slices to determine $Z_{t-1}$. FIG. 3 depicts a complete 2T RMU path pipeline 300 including a plurality of 2T RMU slices (302.1 through 302.5) to compute $Z_t$ and $Z_{t-1}$ where the final slice 302.5 is further adapted to compute $Z_{t-1}$. Each of the plurality of 2TRMU slices (302.1 through 302.5) receives path equivalency information $EQX_{t-1}$, $EQY_{t-1}$, $EQY_t$, and $EQZ_t$. In addition, each of the plurality of slices receives two input state metric different values corresponding to a sequence of two samples, $SMD_t$ and $SMD_{t-1}$. Still further, each 2T RMU slice receives the output of min function 304 representing the minimum value of $SMD_t$ and $SMD_{t-1}$. Each slice also receives 2 LLR values of a preceding slice of the pipeline 300 from a preceding 2t clock signal pulse as input LLR values to be updated ($W_{t-2}$ and $X_{t-2}$). An initial slice 302.1 receives a highest possible confidence value (e.g., an infinite initial LLR value) as its corresponding inputs $W_{t-2}$ and $X_{t-2}$. Each of the plurality of slices performs computations as described in the equations above to generate a corresponding $Y_t$ and $Z_t$ output signals (output updated LLR values). In particular, the output of the first 2T RMU slice 302.1 is applied as the $W_{t-2}$ and $X_{t-2}$ inputs to the second 2T RMU slice 302.2. The $Y_t$ and $Z_t$ outputs of the second 2T RMU slice 302.2 are applied as $W_{t-2}$ and $X_{t-2}$ inputs to the third 2T RMU slice 302.3 and so on through the final 2T RMU slice 302.5. The $Z_t$ output of the final 2T RMU slice 302.5 represents one of the two ultimate outputs of the pipelined 2T RMU path 300 ($Z_t$). The other final output generated by the 2T RMU pipelined path 300 ($Z_{t-1}$) requires additional processing based on the output $Y_t$ from the final 2T slice 302.5. Specifically the $Y_t$ output of the final 2T RMU slice 302.5 at the preceding clock (t–2) is applied as one input to multiplexor 308 and is also applied as an input to min function 306. The other input to min function 306 is $SMD_{t-1}$. The output of min function 306 is applied as the second input to multiplexor 308. Based on the path equivalency information $EQZ_{t-1}$, multiplexer 308 applies a selected one of its two inputs to the input of register 310. The output of register 310 then represents the computed value $Z_{t-1}$—the other final output of 2T RMU pipelined path 300.

The design of an exemplary 2T RMU slice circuit (i.e., each of 302.1 through 302.5 of FIG. 3) to compute $Y_t$ and $Z_t$ is shown in FIG. 4. As noted above, each 2T RMU slice 302 receives $SMD_t$, $SMD_{t-1}$, and the output of a minimum function of $SMD_t$ and $SMD_{t-1}$ as input signals. In addition, each 2T RMU slice 302 receives two LLR values from a preceding slice $W_{t-2}$ and $X_{t-2}$ (configured as a predetermined highest confidence values in the case of the first slice of a pipelined sequence of a plurality of 2T RMU slices). A first multiplexer 400 receives the $W_{t-2}$ LLR value from a preceding slice as a first input. Another input to multiplexer 400 is the minimum function 402 output of the minimum of $W_{t-2}$ and the received input of the minimum of $SMD_t$ and $SMD_{t-1}$. Yet another input to multiplexer 400 is the output of minimum function 404 as the minimum of $W_{t-2}$ and $SMD_t$. Lastly, another input to multiplexer 400 is the output of minimum function 406 as the minimum of $W_{t-2}$ and $SMD_{t-1}$. Selection inputs to multiplexer 400 comprise path equivalency information corresponding with each of the two hard decision values ($SMD_t$ and $SMD_{t-1}$)—namely $EQY_t$ and $EQX_{t-1}$. As expressed in the equations above the output of multiplexer 400 based on the path equivalency information selection values is applied as an input to REG Y 408 to generate the $Y_t$ LLR value output for application to a next slice (or for further processing in the case of the final slice). Multiplexer 410 receives similar input to those described above for multiplexer 400 except it receives the $X_{t-2}$ input instead of the $W_{t-2}$ input and receives the path equivalency information corresponding to the $X_{t-2}$ preceding LLR value—namely $EQZ_t$ and $EQY_{t-1}$. The selected output of multiplexer 410 is then applied to REG Z 418 for generation of the $Z_t$ output of the 2T RMU slice for application to a next slice or as one of the two final values produced by the corresponding 2T RMU pipelined.

Figure 5:
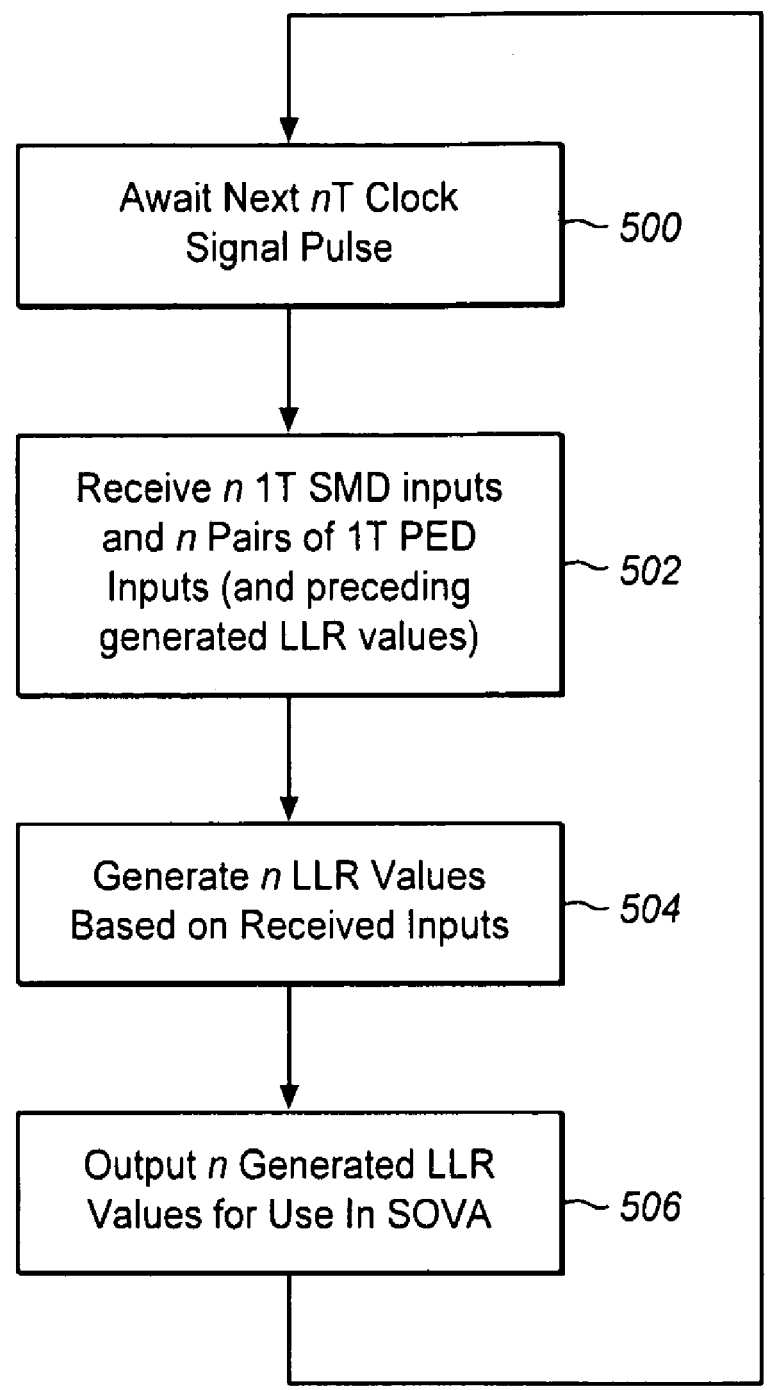
FIG. 5 is flowchart describing operation of an nT SOVA decoder to generate 1T log-likelihood ratio (LLR) information on each nT clock pulse in accordance with features and aspects hereof.

FIG. 5 is a flowchart of an exemplary method in accordance with features and aspects hereof describing operation of an nT RMU pipeline such as exemplary 2T RMU embodiment described above with respect to FIGS. 3 and 4. Step 500 awaits a next pulse of the nT clock signal. Thus the method of FIG. 5 is operable on each pulse of the nT clock signal. Responsive to the next nT clock signal pulse sent, step 502 receives n 1T SMD inputs and associated 1T path equivalency information as inputs to the RMU pipeline. In addition, and as noted above, each slice of the nT RMU pipeline will also receive n LLR values from a preceding slice in the pipeline (or infinite/highest confidence values in the case of a first RMU slice of the RMU pipeline). Step 504 then generates n updated LLR values based on the received input (and the previous LLR values received from a preceding slice of the nT RMU pipeline). Step 506 then generates n LLR values as final LLR values representing the confidence in the corresponding decoded n values in the SOVA decoder.

The particular processing of steps 504 and 506 to generate n output final LLR values on each pulse of the nT clock signal are as described above with respect to the logic equations and with respect to the circuits of FIGS. 3 and 4.

Those of ordinary skill in the art will readily recognize that the nT RMU pipeline discussed above with respect to FIGS. 1 through 4 and the associated equations discussed above express the computations of an RMU unit evaluating a single path of the trellis performed by the SOVA decoder. Multiple such paths may be evaluated in parallel by replicating the logic discussed above and adding appropriate logic to combine the output of the various paths to select the most likely path of the multiple paths evaluated. Such additional logic will be readily apparent to those of ordinary skill in the art. Still further, the specific exemplary embodiment of a 2T RMU pipeline discussed above with respect to FIGS. 3 and 4 can be readily extended by those of ordinary skill in the art to provide a more generalized nT implementation.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for generating 1T log-likelihood ratio (LLR) values from an nT reliability measurement unit (RMU) in a soft output Viterbi algorithm (SOVA) decoder where n is greater than 1, the method comprising:
   responsive to each nT clock pulse, performing the steps of:
   receiving multiple inputs in the RMU the multiple inputs corresponding to signals generated by 1T operation of the SOVA decoder;
   generating LLR values in the nT RMU based on the received 1T multiple inputs; and
   outputting the LLR values as soft output information associated with the decision data output of the SOVA decoder.

2. The method of claim 1
   wherein the step of receiving further comprises:
   receiving state metric data (SMD) values from an add, compare, select (ACS) component of the SOVA decoder as a portion of the multiple inputs to the nT RMU component of the SOVA decoder where the n SMD values correspond to n sequential outputs of the ACS as though operating at a 1T clock frequency; and
   receiving path equivalency information values from a path equivalency detector component of the SOVA decoder as a portion of the multiple inputs to the nT RMU component of the SOVA decoder where the path equivalency information values correspond to n sequential outputs of the path equivalency detector as though operating at a 1T clock frequency.

3. The method of claim 2
   where n is 2,
   where the nT RMU comprises a plurality of slices, each slice generating 2 LLR values to advance the LLR value computation to a next depth of a predetermined fixed depth,
   wherein the SMD values received at nT clock pulse number t are $SMD_{t-1}$ and $SMD_t$,
   wherein the path equivalency information values received at nT clock pulse number t are $EQX_{t-1}$, $EQY_t$, $EQY_{t-1}$, and $EQZ_t$, and
   wherein the step of generating further comprises:
   generating 2 LLR values responsive to nT clock pulse number t as $Y_t$ and $Z_t$ as:

if $(EQY_t=1)$ & $(EQX_{t-1}=1)$ then $Y_t=W_{t-2}$ if $(EQY_t=1)$ & $(EQX_{t-1}=0)$ then $Y_t=\min(W_{t-2}, SMD_{t-1})$ if $(EQY_t=0)$ & $(EQX_{t-1}=1)$ then $Y_t=\min(W_{t-2}, SMD_t)$ if $(EQY_t=0)$ & $(EQX_{t-1}=0)$ then $Y_t=\min(W_{t-2}, SMD_{t-1}, SMD_t)$ if $(EQZ_t=1)$ & $(EQY_{t-1}=1)$ then $Z_t=X_{t-2}$ if $(EQZ_t=1)$ & $(EQY_{t-1}=0)$ then $Z_t=\min(X_{t-2}, SMD_{t-1})$ if $(EQZ_t=0)$ & $(EQY_{t-1}=1)$ then $Z_t=\min(X_{t-2}, SMD_t)$ if $(EQZ_t=0)$ & $(EQY_{t-1}=0)$ then $Z_t=\min(X_{t-2}, SMD_{t-1}, SMD_t)$, where:
   min is a function that determines the minimum value of listed parameters,
   $W_{t-2}$ is an LLR value relating to a preceding nT clock signal pulse, and
   $X_{t-2}$ is an LLR value relating to a preceding nT clock signal pulse.

4. The method of claim 3
wherein the step of generating further comprises:
generating final LLR values in conjunction with a final slice including $Z_t$ as above and $Z_{t-1}$ as:

if $(EQZ_{t-1}=1)$ then $Z_{t-1}=\min(Y_{t-2}, SMD_{t-1})$ if $(EQZ_{t-1}=0)$ then $Z_{t-1}=Y_{t-2}$.

5. The method of claim 3
wherein the step of generating further comprises:
applying initial LLR values representing highest confidence as Wt-2 and Xt-2 as inputs to a first slice.

6. A circuit usable in conjunction with a soft output Viterbi algorithm (SOVA) decoder, the SOVA decoder operable to generate 1T signals as inputs to the circuit, the circuit comprising:
an nT clock signal source adapted to generate an nT clock signal pulse at a frequency of 1/n of the data rate of the SOVA decode where n is greater than 1;
an nT reliability measurement unit (RMU) circuit coupled to receive the nT clock signal pulses, the RMU circuit adapted to receive 1T input signals from the SOVA decoder, the RMU circuit further adapted to output n log-likelihood ratio (LLR) values in response to each nT clock pulse signal, the LLR values based on the received 1T input signals, the n LLR values used by the SOVA decoder to determine a most likely output for a received symbol.

7. The circuit of claim 6
wherein the RMU circuit further comprises:
a plurality of slices each adapted to generate n LLR values to advance the LLR value computation to a next depth of a predetermined fixed depth, each slice coupled to receive n state metric difference (SMD) values from the SOVA decoder, each slice coupled to receive path equivalency information values from the SOVA decoder, each slice coupled to receive n LLR values relating to a preceding nT clock signal pulse, each slice adapted to generate n LLR values based on the received SMD values and the received path equivalency information values and the received LLR values.

8. The circuit of claim 7
where n is 2,
wherein the received SMD values received at nT clock pulse number t are $SMD_{t-1}$ and $SMD_t$,
wherein the path equivalency information values received at nT clock pulse number t are $EQX_{t-1}$, $EQY_t$, $EQY_{t-1}$, and $EQZ_t$, and
wherein each slice is adapted to generate 2 LLR values responsive to nT clock pulse number t as $Y_t$ and $Z_t$ as:

if $(EQY_t=1)$ & $(EQX_{t-1}=1)$ then $Y_t=W_{t-2}$ if $(EQY_t=1)$ & $(EQX_{t-1}=0)$ then $Y_t=\min(W_{t-2}, SMD_{t-1})$ if $(EQY_t=0)$ & $(EQX_{t-1}=1)$ then $Y_t=\min(W_{t-2}, SMD_t)$ if $(EQY_t=0)$ & $(EQX_{t-1}=0)$ then $Y_t=\min(W_{t-2}, SMD_{t-1}, SMD_t)$ if $(EQZ_t=1)$ & $(EQY_{t-1}=1)$ then $Z_t=X_{t-2}$ if $(EQZ_t=1)$ & $(EQY_{t-1}=0)$ then $Z_t=\min(X_{t-2}, SMD_{t-1})$ if $(EQZ_t=0)$ & $(EQY_{t-1}=1)$ then $Z_t=\min(X_{t-2}, SMD_t)$ if $(EQZ_t=0)$ & $(EQY_{t-1}=0)$ then $Z_t=\min(X_{t-2}, SMD_{t-1}, SMD_t)$, where:
min is a function that determines the minimum value of listed parameters,
$W_{t-2}$ is an LLR value relating to a preceding nT clock signal pulse, and
$X_{t-2}$ is an LLR value relating to a preceding nT clock signal pulse.

9. The circuit of claim 8
wherein a last slice is further adapted to generate final LLR values including $Z_t$ as above and $Z_{t-1}$ as:

if $(EQZ_{t-1}=1)$ then $Z_{t-1}=\min(Y_{t-2}, SMD_{t-1})$ if $(EQZ_{t-1}=0)$ then $Z_{t-1}=Y_{t-2}$.

10. The circuit of claim 8
wherein the first slice is adapted to receive initial LLR values representing highest confidence as Wt-2 and Xt-2 input values.

11. The circuit of claim 7
wherein the RMU processes inputs to a predetermined depth "M", and
wherein the number of slices in the plurality of slices is M/n.

\* \* \* \* \*